(12) United States Patent
Revankar et al.

(10) Patent No.: US 12,196,281 B2
(45) Date of Patent: Jan. 14, 2025

(54) AUTOMATIC SLACK ADJUSTER FOR BRAKING SYSTEMS OF AUTOMOTIVE VEHICLES, BRAKING SYSTEM AND CORRESPONDING WHEELS

(71) Applicant: WABCO India Limited, Chennai TN (IN)

(72) Inventors: Akash Ashok Revankar, Karnataka (IN); Paranjothi Rajasekar, Tamil Nadu (IN)

(73) Assignee: ZF Commercial Vehicle Control Systems India Limited, Tamil Nadu (IN)

( * ) Notice: Subject to any disclaimer, the term of this patent is extended or adjusted under 35 U.S.C. 154(b) by 0 days.

(21) Appl. No.: 17/949,360

(22) Filed: Sep. 21, 2022

(65) Prior Publication Data
US 2023/0097070 A1    Mar. 30, 2023

(51) Int. Cl.
*F16D 65/68*  (2006.01)

(52) U.S. Cl.
CPC .................... *F16D 65/68* (2013.01)

(58) Field of Classification Search
CPC .......... F16D 65/46; F16D 65/58; F16D 65/60; F16D 65/68; F16D 2066/003; F16D 2125/28
USPC ...................................................... 188/29.55
See application file for complete search history.

(56) References Cited

U.S. PATENT DOCUMENTS

| | | | |
|---|---|---|---|
| 4,945,818 A | 8/1990 | Ware | |
| 5,213,056 A * | 5/1993 | Nicholls | B60T 17/221 188/1.11 R |
| 5,320,198 A * | 6/1994 | Hoyt | F16D 66/02 188/1.11 W |
| 5,441,128 A * | 8/1995 | Hoyt | F16D 66/02 188/1.11 W |
| 5,762,165 A * | 6/1998 | Crewson | F16D 65/60 188/1.11 W |
| 6,059,074 A * | 5/2000 | Crewson | F16D 66/02 188/1.11 R |
| 6,072,389 A | 6/2000 | Strasburger | |
| 6,105,730 A * | 8/2000 | Ekeroth | F16D 66/025 324/207.2 |
| 6,135,242 A * | 10/2000 | Hockley | F16D 66/00 188/1.11 R |
| 11,181,140 B1 * | 11/2021 | Ring | B60T 11/18 |

(Continued)

*Primary Examiner* — Robert A. Siconolfi
*Assistant Examiner* — San M Aung
(74) *Attorney, Agent, or Firm* — Dickinson Wright PLLC (57) ABSTRACT

An automatic slack adjuster (1, 101, 201) for braking systems of automotive vehicles, in particular for drum brakes of commercial vehicles, includes a lever (3, 103, 203) configured to be operatively coupled to a push rod (117, 217) of a brake actuator, and to pivot about a rotational axis (R) when actuated by the push rod (117, 217), the rotational axis (R) having a predetermined fixed location relative to the vehicle. The stroke level of the slack adjuster (1, 101, 201) is moveable between a predetermined zero stroke position (7a, 107a, 207a) and a working stroke range (7b). The invention furthermore relates to a braking system (100) for an automotive vehicle and a wheelset (200) can include the slack adjuster. An electronic detection unit (98, 109, 209) determines the current stroke level of the automatic slack adjuster (1, 101, 201).

14 Claims, 4 Drawing Sheets

(56) References Cited

U.S. PATENT DOCUMENTS

| | | | |
|---|---|---|---|
| 2007/0205060 A1* | 9/2007 | Salazar | F16D 66/00 |
| | | | 188/1.11 W |
| 2013/0255366 A1* | 10/2013 | Seglo | B60T 7/042 |
| | | | 74/519 |
| 2013/0275018 A1* | 10/2013 | Todd | F16D 66/00 |
| | | | 701/70 |
| 2016/0010711 A1* | 1/2016 | Root | F16D 65/58 |
| | | | 188/196 R |
| 2018/0038433 A1* | 2/2018 | Drake | F16D 65/28 |
| 2019/0145476 A1* | 5/2019 | Drake | F16D 65/28 |
| | | | 188/196 R |

* cited by examiner

AUTOMATIC SLACK ADJUSTER FOR BRAKING SYSTEMS OF AUTOMOTIVE VEHICLES, BRAKING SYSTEM AND CORRESPONDING WHEELS

FIELD

The present disclosure relates to an automatic slack adjuster for braking systems of automotive vehicles, in particular for drum brakes of commercial vehicles, including a lever that is configured to be operatively coupled to a push rod of a brake actuator, and to pivot around a rotational axis when actuated by the push rod, the rotational axis having a predetermined fixed location relative to the vehicle, wherein the stroke level of the slack adjuster is at least adjustable between a predetermined zero stroke position and a working stroke range.

BACKGROUND

Automatic slack adjusters are used to maintain constant gap widths between a brake lining or brake pad of the brake mechanism and the counterpart to be braked such as a brake drum mounted to a wheel. Exemplary brake mechanisms used in combination with automatic slack adjusters are so-called "S-Cam" brakes. Automatic slack adjusters are typically designed and required to operate with specific working gap widths. Those working gap widths are set during manufacture of the automatic slack adjuster such that each individual slack adjuster type will have a specific range of working gap width between lining and drum, i.e. brake pad and counterpart to be braked.

During the installation procedure of a brake mechanism to the vehicle, the automatic slack adjuster needs to be fitted to the vehicle. In most cases, the automatic slack adjuster is fitted and mounted to an axle or swing arm of the vehicle. During fitting of the automatic slack adjuster, the operator has to ensure that the stroke transmitted to the slack adjuster and to the brake mechanism remains within legally specified limits.

In order to avoid requiring the operator with a tool to inspect whether fitment has been done correctly, there are prior art systems available comprising a stroke indicator label and a stroke indicator element that can be visually inspected by the operator. A major drawback associated with this solution, however, is that said devices are mechanically complex and need to be visually inspected directly at the position where the slack adjusters are mounted.

In addition, actuator stroke measurement devices are known from the prior art. These devices allow for an electronic measurement of the actuator stroke. Such devices are known, for example, from U.S. Pat. Nos. 4,945,818 A and 6,072,389 A. A major drawback of these devices however is that the measurement accuracy of these devices is not always sufficient to exactly determine the stroke level.

SUMMARY

It was therefore an object to the present disclosure to provide an improved automatic slack adjuster which overcomes these disadvantages of the prior art as much as possible. In particular, it was an object of the present disclosure to provide an automatic slack adjuster that is capable of exactly determining the current stroke level of the slack adjuster without requiring visual inspections to be conducted by an operator.

The invention achieves the aforementioned object by providing an automatic slack adjuster that includes an electronic detection unit that determines the current stroke level of the automatic slack adjuster. The present disclosure is based upon the realization that by determining the current stroke level of the automatic slack adjuster directly at the slack adjuster a more accurate and reliable measurement result is generated, compared to prior art solutions measuring the actuator stroke directly at the actuator. Furthermore, due to the electronic detection unit, a visual inspection by an operator is no longer required. The current stroke level can conveniently be monitored from the dashboard.

In a preferred embodiment, the electronic detection unit comprises a stroke indicator element that is positioned on the automatic slack adjuster such that the lever pivots relative to the stroke indicator element about the rotational axis as a function of the current stroke level of the automatic slack adjuster, and a sensor arrangement that is positioned on the lever in the proximity of the indicator element, wherein the sensor element is configured to determine the relative position of the indicator element to the sensor arrangement. With the help of the stroke indicator element and the sensor arrangement, the current stroke level of the automatic slack adjuster can be conveniently and accurately measured.

In a further preferred embodiment, the sensor arrangement comprises at least one of the following sensors: inductive sensor, capacitance sensor, or hall sensor.

These types of sensors are well-proven to exactly determine the position of an indicator element comprising a respective signal transmitter, depending on the type of sensor used. For example, when using a hall sensor, the stroke indicator element may comprise a magnet.

In a further preferred embodiment, the stroke indicator element further comprises a mounting piece configured to attach the stroke indicator element in a fixed location to the vehicle. Thereby, a reliable indicating function can be achieved without having to move the stroke indicator element itself at all. Rather, the present disclosure suggests having the stroke indicator element remain stationary on the vehicle, while only the slack adjuster moves, i.e. pivots around the rotational axis. This simplifies the part complexity and mounting procedure.

In a further preferred embodiment, the electronic detection unit comprises a link that is pivotably coupled to the lever and abuts against a push rod, and a sensor arrangement arranged at the lever, wherein the sensor arrangement is configured to determine a relative angle between the link and the lever that is indicative for the current stroke level of the automatic slack adjuster. According to this alternative solution, a link that is pivotably coupled to the lever and abuts against the push rod is utilized as a signal transmitter. By determining the relative angle between the link and the lever, the current stroke level of the automatic slack adjuster is determined.

In a further preferred embodiment, the sensor arrangement comprises an angular sensor that is configured for determining the relative angle between the link and the lever. Such an angular sensor is well-proven and provide accurate measurement results based on which the current stroke level of the automatic slack adjuster can be determined.

In a further preferred embodiment, the link comprises a spring element that is configured for forcing the link against the push rod. With the help of such spring element, it is ensured that the lever abuts against the push rod permanently and that accurate and reliable measurement results are generated by the sensor arrangement.

According to a further preferred and alternative embodiment, the electronic detection unit comprises a first link that is pivotably coupled to the lever and a second link that is pivotably coupled to the push rod, wherein the first link and the second link are coupled to one another by way of a slot guide such that the first and second links slide relative to one another as a function of the current stroke level of the automatic slack adjuster, and a sensor arrangement that is configured to determine a relative position of the first link to the second link at the slot guide. According to this alternative solution, two links coupled to one another by way of a slot guide are utilized to determine a current stroke level of the automatic slack adjuster. This solution is based upon the realization that the solution comprising said two links may be beneficial for certain assembly applications for which additional room for sensors may be limited.

In a further preferred embodiment, the sensor arrangement is positioned at the second link. This further reduced the overall dimensions of the device.

According to yet another preferred embodiment, the rotational axis is oriented coaxially to a rotating brake shaft of the braking system. The rotating brake shaft is also referred to as a cam shaft or a cam spline for drum brakes.

The invention has herein above been described with reference to an automatic slack adjuster in a first aspect of the invention. In a second aspect, however, the invention relates to a braking system for an automotive vehicle, in particular a drum brake system for a commercial vehicle, the braking system comprising a brake actuator, in particular a pneumatic, electropneumatic or electronic brake actuator, having a push rod, a brake mechanism, in particular a drum brake, configured to apply a braking force to a wheel of the vehicle, said brake mechanism preferably having at least one non-rotating brake pad (also referred to as brake liner) and preferably at least one rotating part to be braked (such as a brake drum) and an air gap between the brake pad and the part to be braked, and an automatic slack adjuster operatively coupled between the brake actuator and the brake mechanism.

The invention achieves the initially mentioned object in this second aspect by suggesting a braking system of the aforementioned type, wherein the automatic slack adjuster is configured in accordance with any one of the preferred embodiments described herein above under the first aspect.

The advantages and preferred embodiments of the automatic slack adjuster of the first aspect are at the same time also advantages and preferred embodiments of the braking system of the second aspect. In order to avoid unnecessary repetition, reference is made to the description herein above.

In a further aspect, the invention also relates to a wheelset of an automotive vehicle, in particular of a commercial vehicle, comprising an axle or swingarm, a wheel rotatably mounted to the axle or swingarm, a brake actuator fixedly mounted to the axle or swingarm, a brake mechanism fixedly mounted to the axle or swingarm and operatively coupled to the brake actuator in order to apply a braking force to the wheel, and an automatic slack adjuster operatively coupled between the brake actuator and the brake mechanism.

The invention achieves the initially mentioned object with a wheelset of this aspect by suggesting that the automatic slack adjuster is configured in accordance with any one of the preferred embodiments described herein above in the first aspect.

Also with the third aspect, preferred embodiments and advantages of the automatic slack adjuster of the first aspect are at the same time preferred embodiments and advantages of the wheelset according to the invention. In order to avoid unnecessary repetition, reference is made to the description herein above for that reason.

For a more complete understanding of the invention, the invention will now be described in more detail with reference to the accompanying drawings. The detailed description will illustrate and describe, or is considered as, one preferred embodiment of the present disclosure. It should of course be understood that various modifications and changes in form or detail could readily be made without departing from the scope of the invention. It is therefore intended that the invention may not be limited to the exact form and detail shown and described herein, nor to anything less than the whole of the invention disclosed herein and disclaimed hereinafter. Further, the features described in the description, the drawings, and the claims disclosing the invention may be essential for the invention considered alone or in combination. In particular, any reference signs in the claims shall not be construed as limiting the scope of the invention. The word "comprising" does not exclude other elements or steps. The wording "a" or "an" does not exclude a plurality.

BRIEF DESCRIPTION OF THE DRAWINGS

The invention will now be described with reference to the accompanying drawings which illustrate, one of several possible embodiments of the automatic slack adjuster proposed herein by way of example and not by way of limitation, and wherein.

DETAILED DESCRIPTION

Figure 1:
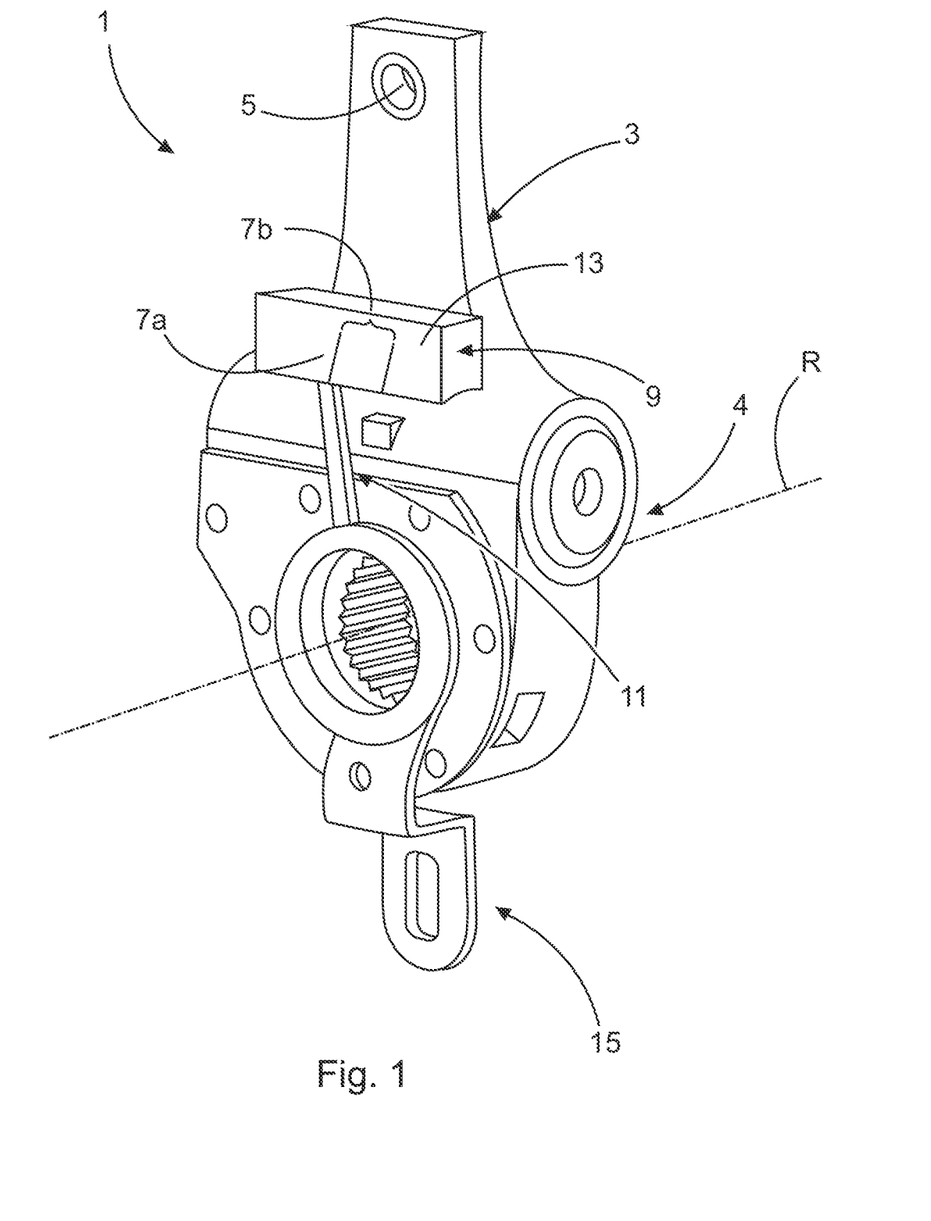
FIG. 1 is an isometric view of an automatic slack adjuster according an aspect of the present disclosure.

FIG. 1 depicts an automatic slack adjuster 1. The automatic slack adjuster 1 includes a lever 3. The lever 3 is configured to be operatively coupled to a push rod (not shown) of a brake actuator. The lever 3 pivots about a rotational axis R and is actuated by the push rod. The rotational axis R has a predetermined fixed location relative to a vehicle (not shown). The stroke level of the slack adjuster 1 is adjustable between a predetermined zero stroke position 7a and a working stroke range 7b. The automatic slack adjuster 1 comprises an electronic detection unit 9. The electronic detection unit 9 is configured for determining the current stroke level of the automatic slack adjuster 1.

The electronic detection unit 9 includes a stroke indicator element 11. The stroke indicator element 11 is positioned on the automatic slack adjuster 1 such that the lever 3 pivots relative to the stroke indicator element 11 about the rotational axis R as a function of the current stroke level of the automatic slack adjuster 1. The electronic detection unit 9 further includes a sensor arrangement 13. The sensor arrangement 13 is positioned on the lever 3 in the proximity of the indicator 11. The sensor arrangement 13 is configured to determine the relative position of the indicator element 11 to the sensor arrangement 13. The sensor arrangement 13 comprises an inductive sensor, a capacitance sensor, or a hall sensor. The stroke indicator element 11 further includes a mounting piece 15. The mounting piece 15 is configured to attach the stroke indicator element 11 in a fixed location to the vehicle. The automatic slack adjuster 1 further includes a slack adjuster mechanism 4. The lever 3 includes a mounting interface 5 for coupling the lever 3 to the push rod (not shown).

Figure 2:
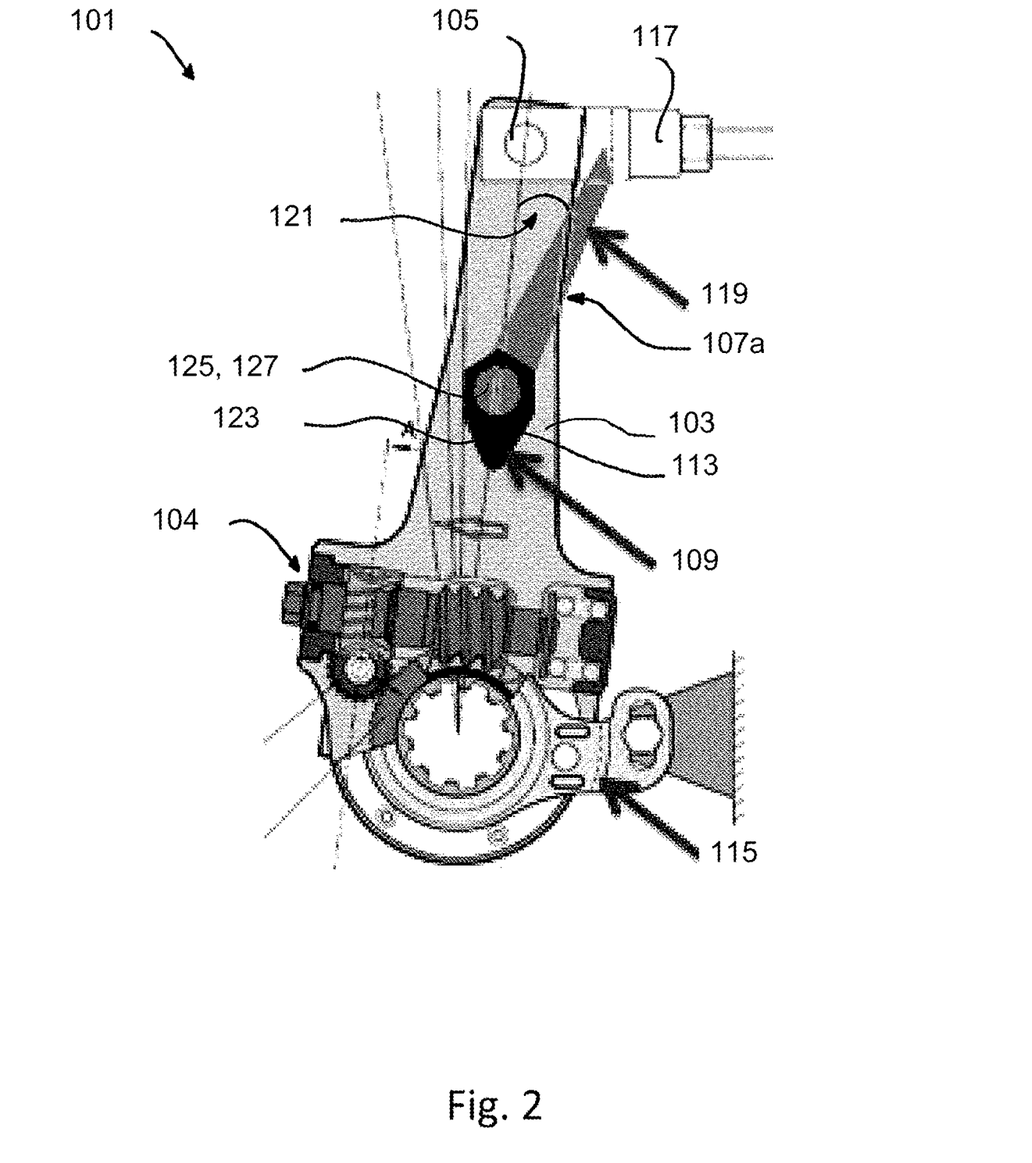
FIG. 2 is a front view of an automatic slack adjuster illustrating another aspect of the present disclosure.

FIG. 2 shows an alternative embodiment of an automatic slack adjuster 101. The automatic slack adjuster 101 includes a lever 103 that is configured to be operatively coupled to a push rod 117 via a mounting interface 105. The automatic slack adjuster 101 further includes an electronic detection unit 109. The electronic detection unit 109 is configured for determining the current stroke level of the automatic slack adjuster 101. In this embodiment, electronic detection unit 109 comprises a link 119. The link 119 is pivotably coupled to the lever 103. The link 119 furthermore abuts against the push rod 117. The electronic detection unit 109 further includes a sensor arrangement 113. The sensor arrangement 113 is arranged at the lever 103. The sensor arrangement 113 is configured to determine a relative angle 121 between the link 119 and the lever 103. The relative angle 121 is indicative of the current stroke level of the automatic slack adjuster 101. The automatic slack adjuster 101 further includes a slack adjuster mechanism 104. The automatic slack adjuster 101 is shown in a zero stroke position 107a in FIG. 2. The automatic slack adjuster 101 is attached to the vehicle via a mounting piece 115.

The sensor arrangement 113 comprises an angular sensor 123. The angular sensor 123 is configured for determining the relative angle 121 between the link 119 and the lever 103. The link 119 comprises a spring element 125. The spring element 125 is configured to force the link 119 against the push rod 117. The spring element 125 is configured as or comprises a torsion spring 127.

Figure 3:
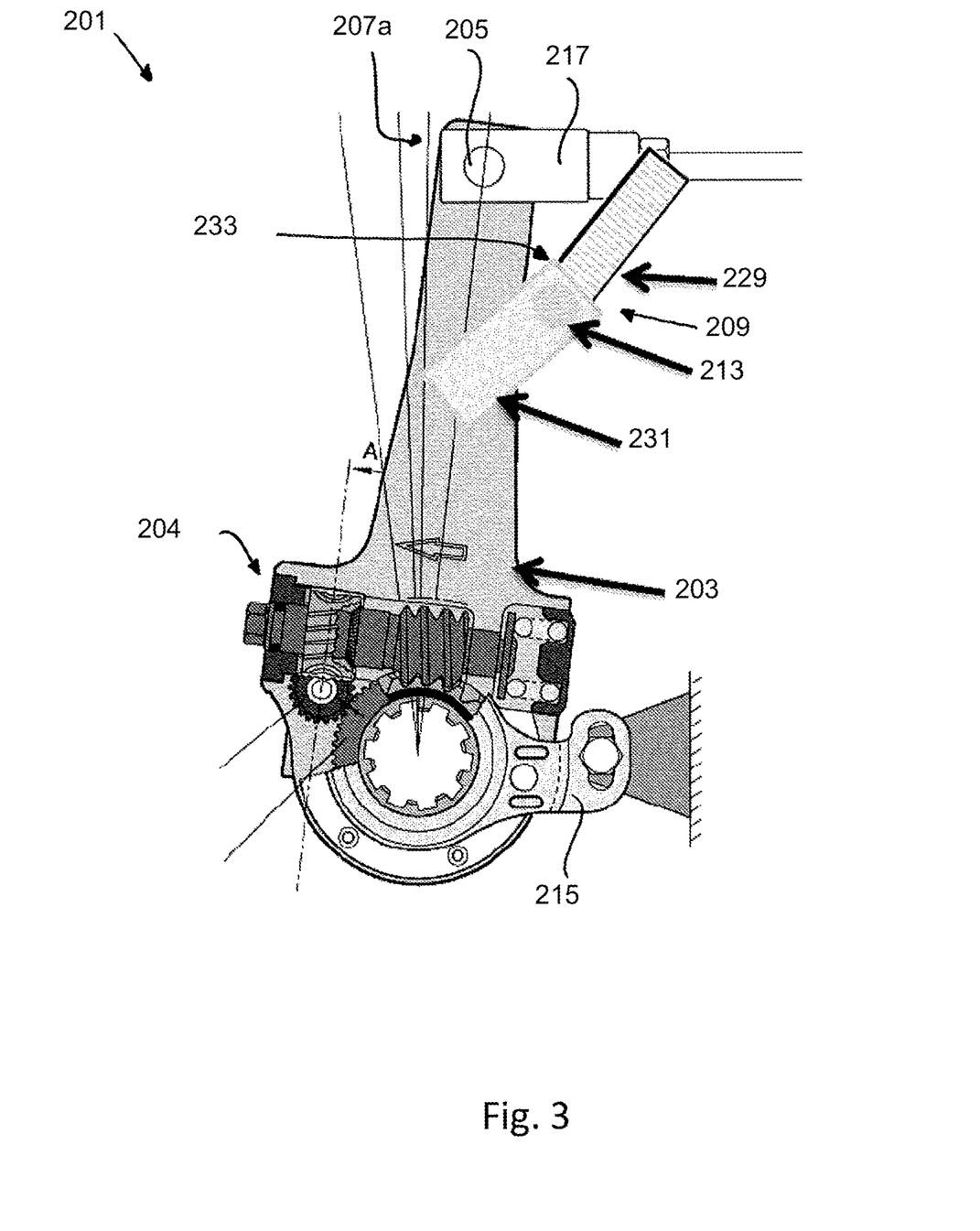
FIG. 3 is a front view of an automatic slack adjuster illustrating another aspect of the present disclosure.

A further alternative embodiment of an automatic slack adjuster 201 is shown in FIG. 3. As already explained with regard to the previous figures, the automatic slack adjuster 201 comprises a lever 203 and a slack adjuster mechanism 204. The lever 203 is connected to a push rod 217 via a mounting interface 205. The automatic slack adjuster 201 is shown in its zero stroke position 207a. The automatic slack adjuster 201 is attached to the vehicle via a mounting piece 215. In this embodiment, electronic detection unit 209 comprises a first link 231 and a second link 229. The first link 231 is pivotably coupled to the lever 203. The second linked 231 is pivotably coupled to the push rod 217. The first link 231 and the second link 229 are coupled to one another by means of a slot guide 233. In this way, the first link 231 and the second link 229 slide relative to one another as a function of the current stroke level of the automatic slack adjuster 201. The electronic detection unit 209 further includes a sensor arrangement 213. The sensor arrangement 213 is configured to determine a relative position of the first link 231 to the second link 229 at the slot guide 233. The sensor arrangement 213 is positioned at the second link 229. Furthermore, as can be seen with reference to FIG. 1-3, the rotational axis R is oriented coaxially to a rotating brake shaft of the braking system.

Figure 4:
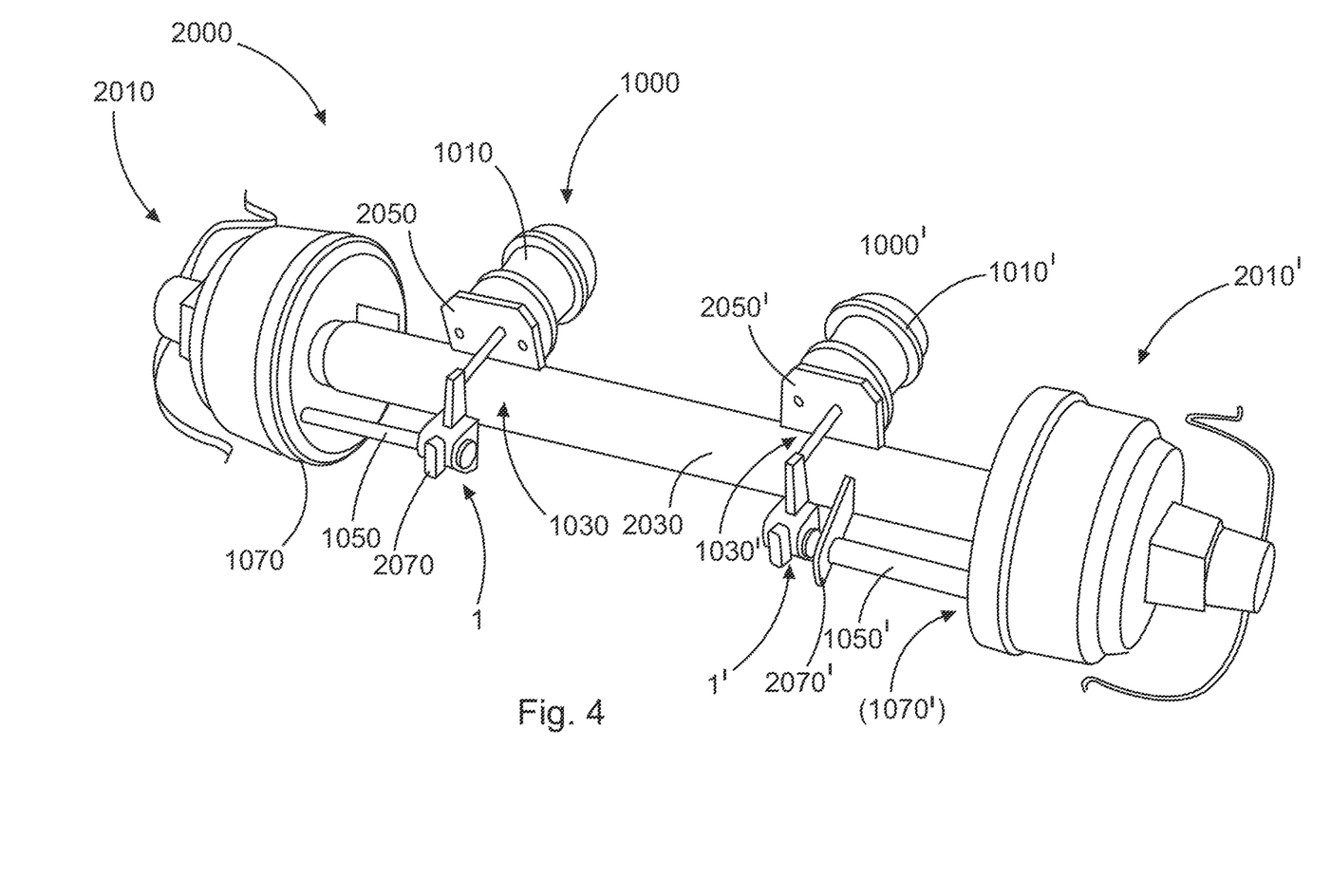
FIG. 4 is an isometric view of the automatic slack adjuster of FIG. 1 installed on a wheelset of a vehicle.

In operation, the automatic slack adjuster 1 (and 1') is mounted to a wheelset 2000 of a vehicle as is shown exemplarily in FIG. 4. The wheelset 2000 includes a braking system 1000 which has a brake actuator 1010 that is configured to actuate a push rod 1030. The push rod 1030 is operatively coupled to the mounting interface 5 of the lever 3 of the automatic slack adjuster 1. The automatic slack adjuster 1 is mounted to a support element 2070 which in the present embodiment is connected to an axle 2030 of the wheelset 2000, just like the brake actuator 1010 is mounted to a corresponding support element 2050 which in turn is connected to the axle 2030.

The automatic slack adjuster 1 furthermore is coupled to a cam shaft 1050 which transmits the pivoting movement of the slack adjuster 1 to a brake mechanism 1070, for example a drum brake. The brake mechanism 1070 is configured to brake a wheel 2010 of the wheelset 2000.

The wheelset 2000 shown in FIG. 4 additionally comprises a second wheel 2010' which is braked by a second braking system 1000'. The second braking system 1000' is identical in setup as compared to the first braking system 1000, and identical elements are designated with identical reference signs plus an apostrophe.

Thus, the braking system 1000' comprises a brake actuator 1010' that is mounted to a support element 2050' of the wheelset 2000. The brake actuator 1010' actuates and comprises a push rod 1030' which is operatively coupled to a further automatic slack adjuster 1' that is held to a support element 2070' connected to the axle 2030.

The automatic slack adjuster 1' is operatively coupled to a further brake 1070', such as a drum brake, by a cam shaft 1050'.

The embodiments illustrated and described herein above exemplify that the design and installation routine for an automatic slack adjuster having an indicator function is greatly simplified without sacrificing in any way the functionality regarding the read-out of the indicated stroke level.

LIST OF REFERENCE SIGNS

1 automatic slack adjuster
3 lever
4 slack adjuster mechanism
5 mounting interface
7a zero stroke position
7b working stroke range
9 electronic detection unit
11 stroke indicator element
13 sensor arrangement
15 mounting piece
101 automatic slack adjuster
103 lever
104 slack adjuster mechanism
105 mounting interface
107a zero stroke position
109 electronic detection unit
113 sensor arrangement
115 mounting piece
117 push rod
119 link
121 relative angle between link and lever
123 angular sensor
125 spring element
127 torsion spring
201 automatic slack adjuster
203 lever
204 slack adjuster mechanism
205 mounting interface
207a zero stroke position
209 electronic detection unit
213 sensor arrangement
215 mounting piece
217 push rod
229 second link
231 first link
233 slot guide 1000 braking system
1010 brake actuator
1010' brake actuator
1030 push rod
1030' push rod
1050 cam shaft
1050' cam shaft
1070 brake mechanism
1070' brake mechanism
2000 wheelset
2010 wheel
2010' wheel
2030 axle
2050 support element
2050' support element
2070 support element
2070' support element
R rotational axis

What is claimed is:

1. An automatic slack adjuster (1, 101, 201) for a braking system of an automotive vehicle, the automatic slack adjuster comprising:
a lever (3, 103, 203) configured to be operatively coupled to a push rod of a brake actuator,
wherein the lever pivots about a rotational axis (R) when actuated by the push rod (117, 217), the rotational axis (R) having a predetermined fixed location relative to the vehicle,
wherein a stroke level of the slack adjuster (1, 101, 201) is moveable from a predetermined zero stroke position (7a, 107a, 207a) and through a working stroke range (7b), and
an electronic detection unit (9, 109, 209) that determines a current stroke level of the automatic slack adjuster (1, 101, 201) within the working stroke range (7b), wherein the working stroke range is a predetermined operating range;
wherein the electronic detection unit (9) comprises:
a stroke indicator element (11) positioned on the automatic slack adjuster (1) such that the lever (3) pivots relative to the stroke indicator element (11) about the rotational axis (R) as a function of the current stroke level of the automatic slack adjuster (1), and
a sensor arrangement (13) positioned on the lever (3) in the proximity of the indicator element (11), wherein the sensor arrangement (13) determines a position of the indicator element (11) relative to the sensor arrangement (9)
wherein the stroke indicator element (11) further comprises a mounting piece (15) configured to attach the stroke indicator element (11) in a fixed location to the vehicle.

2. The automatic slack adjuster (1) of claim 1, wherein the sensor arrangement (13) comprises at least one of an inductive sensor, a capacitance sensor, or a hall sensor.

3. An automatic slack adjuster (1, 101, 201) for a braking system of an automotive vehicle, the automatic slack adjuster comprising:
a lever (3, 103, 203) configured to be operatively coupled to a push rod of a brake actuator,
wherein the lever pivots about a rotational axis (R) when actuated by the push rod (117, 217), the rotational axis (R) having a predetermined fixed location relative to the vehicle,
wherein a stroke level of the slack adjuster (1, 101, 201) is moveable between a predetermined zero stroke position (7a, 107a, 207a) and a working stroke range (7b), and
an electronic detection unit (9, 109, 209) that determines a current stroke level of the automatic slack adjuster (1, 101, 201), wherein the electronic detection unit (109) comprises:
a link (119) that is pivotably coupled to the lever (103) and abuts against a push rod (117) that is operatively coupled to the lever and that actuates lever, and
a sensor arrangement (113) arranged at the lever (103), wherein the sensor arrangement (113) determines a relative angle (121) between the link (119) and the lever (103) that is indicative of a current stroke level of the automatic slack adjuster (101);
wherein the link (119) includes a spring element (125) that forces the link (119) against the push rod (117).

4. The automatic slack adjuster (101) of claim 3, wherein the sensor arrangement (113) comprises an angular sensor (123) that determines the relative angle (121) between the link (119) and the lever (103).

5. The automatic slack adjuster (101) of claim 3, wherein the spring element (125) is a torsion spring (127).

6. An automatic slack adjuster (1, 101, 201) for a braking system of an automotive vehicle, the automatic slack adjuster comprising:
a lever (3, 103, 203) configured to be operatively coupled to a push rod of a brake actuator,
wherein the lever pivots about a rotational axis (R) when actuated by the push rod (117, 217), the rotational axis (R) having a predetermined fixed location relative to the vehicle,
wherein a stroke level of the slack adjuster (1, 101, 201) is moveable between a predetermined zero stroke position (7a, 107a, 207a) and a working stroke range (7b), and an electronic detection unit (9, 109, 209) that determines a current stroke level of the automatic slack adjuster (1, 101, 201)
wherein the electronic detection unit (209) comprises:
a first link (231) that is pivotably coupled to the lever (203) and a second link (229) that is pivotably coupled to a push rod (217) that is operatively coupled to the lever and that actuates the lever, wherein the first link (231) and the second link (229) are coupled to one another by way of a slot guide (233) such that the first and second links (231, 229) slide relative to one another as a function of the current stroke level of the automatic slack adjuster (201), and
a sensor arrangement (213) that determines a relative position of the first link (231) to the second link (229) at the slot guide (233).

7. The automatic slack adjuster (201) of claim 6, wherein the sensor arrangement (213) is positioned at the second link (231).

8. The automatic slack adjuster (1, 101, 201) of claim 1, wherein the rotational axis (R) is oriented coaxially to a rotating brake shaft of a braking system.

9. The automatic slack adjuster of claim 3,
wherein the slack adjuster is operatively coupled to a braking system for an automotive vehicle, comprising:
a brake actuator (1010) having a push rod (1030),
a brake mechanism (1070) that applies a braking force to a wheel (2010) of the vehicle, and wherein the automatic slack adjuster is (1) operatively coupled between the brake actuator and the brake mechanism201).

10. The automatic slack adjuster of claim 1, wherein the slack adjuster is operatively coupled to a braking system for an automotive vehicle, comprising:
a brake actuator (1010) having a push rod (1030),
a brake mechanism (1070) that applies a braking force to a wheel (2010) of the vehicle, and
wherein the automatic slack adjuster is (1) operatively coupled between the brake actuator and the brake mechanism.

11. The automatic slack adjuster of claim 6, wherein the slack adjuster is operatively coupled to a braking system for an automotive vehicle, comprising:
a brake actuator (1010) having a push rod (1030),
a brake mechanism (1070) that applies a braking force to a wheel (2010) of the vehicle, and
wherein the automatic slack adjuster is (1) operatively coupled between the brake actuator and the brake mechanism.

12. The automatic slack adjuster of claim 9, wherein the brake actuator, the brake mechanism, and the automatic slack adjuster are operatively coupled to a wheelset (2000) of an automotive vehicle, in particular of a commercial vehicle, comprising:
an axle or swingarm (2030),
a wheel (2010) rotatably mounted to the axle or swingarm,
wherein the brake actuator (1010) is fixedly mounted to the axle or swingarm,
wherein the brake mechanism (1070) is fixedly mounted to the axle or swingarm and is operatively coupled to the brake actuator (1010), wherein the brake mechanism applies a braking force to the wheel).

13. The slack adjuster of claim 10, wherein the brake actuator, the brake mechanism, and the automatic slack adjuster are operatively coupled to a wheelset (2000) of an automotive vehicle, in particular of a commercial vehicle, comprising:
an axle or swingarm (2030),
a wheel (2010) rotatably mounted to the axle or swingarm,
wherein the brake actuator (1010) is fixedly mounted to the axle or swingarm, and
wherein the brake mechanism (1070) is fixedly mounted to the axle or swingarm and is operatively coupled to the brake actuator (1010), wherein the brake mechanism applies a braking force to the wheel.

14. The automatic slack adjuster of claim 11, wherein the brake actuator, the brake mechanism, and the automatic slack adjuster are operatively coupled to a wheelset (2000) of an automotive vehicle, in particular of a commercial vehicle, comprising:
an axle or swingarm (2030),
a wheel (2010) rotatably mounted to the axle or swingarm,
wherein the brake actuator (1010) is fixedly mounted to the axle or swingarm, and
wherein the brake mechanism (1070) is fixedly mounted to the axle or swingarm and is operatively coupled to the brake actuator (1010), wherein the brake mechanism applies a braking force to the wheel.

\* \* \* \* \*

UNITED STATES PATENT AND TRADEMARK OFFICE
CERTIFICATE OF CORRECTION

| | | |
|---|---|---|
| PATENT NO. | : 12,196,281 B2 | Page 1 of 1 |
| APPLICATION NO. | : 17/949360 | |
| DATED | : January 14, 2025 | |
| INVENTOR(S) | : Akash Ashok Revankar and Paranjothi Rajasekar | |

It is certified that error appears in the above-identified patent and that said Letters Patent is hereby corrected as shown below:

On the Title Page

Insert:
--(30) Foreign Application Priority Data
Sep. 24, 2021 (IN)....................... 202141043500--

Signed and Sealed this
Eleventh Day of November, 2025

John A. Squires
*Director of the United States Patent and Trademark Office*